United States Patent
Wilsher et al.

(10) Patent No.: US 10,178,280 B2
(45) Date of Patent: Jan. 8, 2019

(54) PAPER TYPE DEPENDENT AUTOMATIC BACKGROUND SUPPRESSION

(71) Applicant: Xerox Corporation, Norwalk, CT (US)

(72) Inventors: Michael J. Wilsher, Letchworth Garden City (GB); Clara Cuciurean-Zapan, Fairport, NY (US); Robert E. Nuuja, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/472,892

(22) Filed: Mar. 29, 2017

(65) Prior Publication Data

US 2018/0288285 A1 Oct. 4, 2018

(51) Int. Cl.
| | |
|---|---|
| *G06T 5/00* | (2006.01) |
| *H04N 1/60* | (2006.01) |
| *H04N 1/58* | (2006.01) |
| *H04N 1/407* | (2006.01) |
| *H04N 1/00* | (2006.01) |

(52) U.S. Cl.
CPC ....... *H04N 1/6058* (2013.01); *H04N 1/00018* (2013.01); *H04N 1/4074* (2013.01); *H04N 1/58* (2013.01)

(58) Field of Classification Search
CPC ............. H04N 1/6058; H04N 1/00018; H04N 1/4074; H04N 1/58
USPC ............. 358/3.26, 1.13, 1.16, 521, 522, 505
See application file for complete search history.

(56) References Cited

U.S. PATENT DOCUMENTS

| | | | | |
|---|---|---|---|---|
| 6,333,993 | B1 * | 12/2001 | Sakamoto | .......... G06K 9/00664 |
| | | | | 358/464 |
| 6,469,805 | B1 * | 10/2002 | Behlok | .................. G06K 15/00 |
| | | | | 358/1.16 |
| 6,995,866 | B2 | 2/2006 | Feng et al. | |
| 7,177,053 | B2 * | 2/2007 | Smith | .................. H04N 1/6011 |
| | | | | 358/3.26 |
| 7,200,263 | B2 | 4/2007 | Curry et al. | |
| 7,236,641 | B2 | 6/2007 | Curry et al. | |
| 7,430,060 | B2 | 9/2008 | Bhattachrjya | |
| 7,551,334 | B2 | 6/2009 | Li | |
| 7,843,616 | B2 | 11/2010 | Li | |
| 7,873,232 | B2 | 1/2011 | Malik | |
| 8,041,143 | B2 | 10/2011 | Tse et al. | |
| 8,175,386 | B2 * | 5/2012 | Kim | ....................... H04N 1/407 |
| | | | | 358/464 |
| 8,736,929 | B2 | 5/2014 | Poysa et al. | |
| 8,922,580 | B2 | 12/2014 | Morovic et al. | |

(Continued)

*Primary Examiner* — Cheukfan Lee
(74) *Attorney, Agent, or Firm* — Gibb & Riley, LLC (57) ABSTRACT

According to exemplary methods, a selection of a paper type for producing an image is received. A database of background suppression values associated with paper types is searched. Responsive to not finding a background suppression value associated with the paper type, the database is updated for the paper type. According to the method of updating, a page of the paper type is scanned and image data obtained by scanning the page is analyzed. Background luminance for the page is determined based on analyzing the image data. A background suppression value is calculated for the page based on the background luminance. The paper type and the background suppression value for the page are added to the database. The background suppression value is associated with the paper in the database.

20 Claims, 9 Drawing Sheets

(56) References Cited

U.S. PATENT DOCUMENTS

| | | | |
|---|---|---|---|
| 9,124,841 B2 | 9/2015 | Subbaian et al. | |
| 9,357,101 B1 | 5/2016 | Metcalfe et al. | |
| 2001/0055122 A1* | 12/2001 | Nagarajan | G06T 5/40 |
| | | | 358/1.9 |
| 2002/0097452 A1* | 7/2002 | Nagarajan | H04N 1/00795 |
| | | | 358/505 |
| 2002/0135787 A1* | 9/2002 | Smith | H04N 1/6011 |
| | | | 358/1.1 |
| 2004/0012817 A1* | 1/2004 | Brewington | H04N 1/40006 |
| | | | 358/3.06 |
| 2007/0035748 A1* | 2/2007 | Zhang | H04N 1/6027 |
| | | | 358/1.9 |
| 2007/0035749 A1* | 2/2007 | Zhang | H04N 1/6016 |
| | | | 358/1.9 |
| 2008/0158610 A1* | 7/2008 | Miyazaki | H04N 1/6022 |
| | | | 358/3.01 |
| 2010/0220927 A1* | 9/2010 | Kim | G06K 9/00456 |
| | | | 382/170 |
| 2016/0366301 A1* | 12/2016 | Schweid | G06K 15/102 |

* cited by examiner

PAPER TYPE DEPENDENT AUTOMATIC BACKGROUND SUPPRESSION

BACKGROUND

Systems and methods herein generally relate to machines having print engines such as printers and/or copier devices and, more particularly, to systems and methods for background suppression in producing an image from a scanned image or the like, using a multi-function document reproduction system.

Typically, in a multi-function device, a document or image is scanned by a digital scanner that converts the light reflected from the document into electrical charges representing the light intensity from predetermined areas (pixels) of the document. The pixels of image data are processed by an image processing system that converts the pixels of image data into electrical signals. The electrical signals can then be utilized by the multi-function device to recreate the scanned image. Sometimes, the white or media substrate regions in the original document are not imaged as white regions in the reproduced document or scan to file. Normally, multi-function devices provide the function of automatic background suppression to make white or media substrate regions in an original document appear white i.e., blank image area, on scanned images or copies. This is sometimes termed relative reproduction as opposed to absolute reproduction. The quality of background suppression is of great importance to many customers.

Background suppression may be applied in the original color space, or the scanned image data can first be converted to a luminance/chrominance color space such as CIELab, Where the luminance value L for each pixel represents the dark to light lightness dimension or luminosity, with "a" and "b" values representing the chrominance components in a two dimensional chrominance plane to define the difference between two different colors of the same luminous intensity. Background adjustment is often employed for improved rendering of scanned images in the scan and copy path of document processing systems such as color scanners and other multi-function devices, and is typically applied separately to luminance and chrominance channels of a set of luminance chrominance pixel values corresponding to a scanned image. The pixels of image data are then processed to convert the pixels of image data into signals that can be utilized by the multi-function device to recreate the scanned image.

Background detection and suppression in color systems is more challenging than in monochrome systems due to the more complex nature of the problem. In some cases, such as if the paper upon which the original image resides is not white, either not neutral or off-white, the background pixels of the image would be printed as colors. This results in lower image quality and wastes toner or ink to render the background color, which is likely not desired. Most users that are copying from a mildly colored piece of paper do not want the color of the paper reproduced. However, if a user wants a copy that is on colored paper, the user may load color paper into the copier before copying the original.

Currently, most copiers employ background suppression to eliminate the background paper color. Most perform this suppression in the lightness component only. The lightness of the background pixels are typically mapped to white, setting their lightness values to the corresponding white level for that copier. In most copiers, lightness will be set to white at 255, assuming 8-bit processing where values range from 0 to 255.

Normally, Automatic Background Suppression (ABS) works on the Lead Edge of a document and changes the Tone Reproduction Curves (TRCs) or changes the gain/offset dynamically after the page has started to be process. Full Page ABS requires a pre-scan for analyzing the whole page data. In the case of a Software Image Path (SWIP), the image path or processing setup, is already built and the processing parameters are already set at the beginning of the job. Thus, even if background data could be collected dynamically on each page of a job, it could normally not be applied to that page or subsequent pages, as this would require a new set of parameters and a rebuild of the image path, which would significantly affect the productivity of the system. If the background level is taken on the first page and the subsequent pages have a different background, the results will not be correct. A solution is needed that does not impact productivity and analyzes the background of the page that is being processed in that moment. Further, a solution is needed to reasonably accommodate the many paper types that a customer might use, such as recycled, pastel, off-white, bluish, yellowish, low weight paper, for example.

SUMMARY

Systems and methods herein provide a solution for dynamically calculating the background suppression required for a specific paper type and using the result of the dynamic calculation to either modify that page or for scanning that paper type in subsequent jobs. The resulting ABS value may be passed as a tag that selects a pre-computed TRC curve from a set of TRCs corresponding to many different background levels, such that the results are immediately applied and are pertinent to the page that is copied in real-time. Hence, the many corrections are already pre-built into the image path and are simply selected. This does not require a re-build of the image path and hence does not affect productivity. Additionally, the ABS value may be optionally 'optimized' by the user.

According to exemplary methods herein, each page of a job is scanned, in turn, and the image data obtained by scanning each said page is analyzed. Background luminance for each page is determined based on analyzing the image data. A background suppression value is calculated for each page based on the background luminance. One of a pre-built tone reproduction curve (TRC) is selected to be applied to the job, based on the background suppression value.

According to exemplary methods herein, selection of a paper type for producing an image is received. A database of background suppression values associated with paper types is searched and a pre-computed Tone Reproduction Curve (TRC) is selected based on the background suppression for the paper type. Color values for pixels in an input image data are adjusted according to the selected TRC. The image data is output using adjusted color values for the pixels. Responsive to not finding a background suppression value associated with the paper type, the database is updated for the paper type. According to the method of updating, a page of the paper type is scanned and image data obtained by scanning the page is analyzed. Background luminance for the page is determined based on analyzing the image data. A background suppression value is calculated for the page based on the background luminance. A new Tone Reproduction Curve (TRC) associated with the background suppression value is computed. The paper type and the background suppression value for the page are added to the database. The background suppression value is associated with the paper in the database. The image is produced on the paper type using the new TRC.

A system herein includes an image input device receiving an image. A processor is operatively connected to the image input device. The processor includes an image processor. A user interface is operatively connected to the processor. The system includes a database of pre-computed Tone Reproduction Curves (TRCs). Each of the TRCs is based on a background suppression value. An output device is operatively connected to the image processor. The image input device scans a page having the image and analyzes the image data obtained by scanning the page. The image processor determines background luminance for the page based on analyzing the image data. The image processor computes a calculated background suppression value for the page based on the background luminance. The image processor selects one of the pre-computed TRCs from the database based on the calculated background suppression value. The image processor adjusts color values of the image according to the selected pre-computed TRC and the image processor outputs the image using adjusted color values. Responsive to the user interface receiving selection of a paper type for producing the image, the processor searches the database for a background suppression value associated with the paper type. Responsive to finding a background suppression value associated with the paper type, the processor selects a pre-computed TRC for producing the image. The image processor adjusts color values of the image according to the selected pre-computed TRC, and the image processor outputs the image using adjusted color values. Responsive to not finding a background suppression value associated with the paper type, the processor updates the database for the paper type. According to the method of updating, the image input device scans a first side of a page of the paper type and a second side of the page of the paper type. The image processor analyzes image data obtained by scanning the first side and the second side of the page of the paper type. The image processor calculates a background suppression value for the page of the paper type. The image processor computes a new Tone Reproduction Curve (TRC) associated with the background suppression value for the page of the paper type. The processor adds the paper type and the background suppression value for the page to the database. The background suppression value is associated with the paper type in the database. The image processor adjusts color values for the image according to the selected TRC and outputs the image using the adjusted color values.

These and other features are described in, or are apparent from, the following detailed description.

BRIEF DESCRIPTION OF THE DRAWINGS

Various examples of the systems and methods are described in detail below, with reference to the attached drawing figures, which are not necessarily drawn to scale and in which.

DETAILED DESCRIPTION

For a general understanding of the features of the disclosure, reference is made to the drawings. In the drawings, like reference numerals have been used throughout to identify identical elements. While the disclosure will be described hereinafter in connection with specific s thereof, it will be understood that limiting the disclosure to such specific systems and methods is not intended. On the contrary, it is intended to cover all alternatives, modifications, and equivalents as may be included within the spirit and scope of the disclosure as defined by the appended claims.

As used herein, an image forming device can include any device for rendering an image on print media, such as a copier, laser printer, bookmaking machine, facsimile machine, or a multi-function machine (which includes one or more functions such as scanning, printing, archiving, emailing, and faxing). "Print media" can be a physical sheet of paper, plastic, or other suitable physical print media substrate for carrying images. For example, the print media can be substantially any type of media upon which a marking engine can print, such as: high quality bond paper, lower quality "copy" paper, overhead transparency sheets, high gloss paper, colored paper, and so forth. A "job" or "document" is referred to for one or multiple sheets copied from an original job sheet(s) or an electronic document page image, from a particular user, or otherwise related. According to systems and methods herein, a 'job' can be a print job, a copy job, a scan job, etc. An original image is used herein to mean an electronic (e.g., digital) or physical (e.g., paper) recording of information. In its electronic form, the original image may include image data in the form of text, graphics, or bitmaps.

To print an image, a print engine processor, sometimes referred to herein as an image processor, converts the image in a page description language or vector graphics format to a bit mapped image indicating a value to print at each pixel of the image. Each pixel may represent a dot, also called a picture element. The sequence of dots forming a character is called a raster pattern. The number of dots per inch that a printer generates is called the print resolution, or density. A resolution of 240 pixels means that a printer prints 240 pixels per inch both vertically and horizontally, or 57,200 pixels per square inch (240×240).

As used herein, a "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, an RGB-to-YCbCr converter to obtain luminance (Y) and chrominance (Cb, Cr) values. It should be appreciated that pixels may be represented by values other than RGB or YCbCr.

Any color space can be used by methods and devices herein including, for example, RGB (red, green, blue), Lab (CIELAB or L*a*b*), YUV (luma (Y') and chrominance (UV)), YCrCb (Y' is the luma component, and CB and CR are the blue-difference and red-difference chroma components), CMYK (cyan, magenta, yellow, black), etc.

Figure 1:
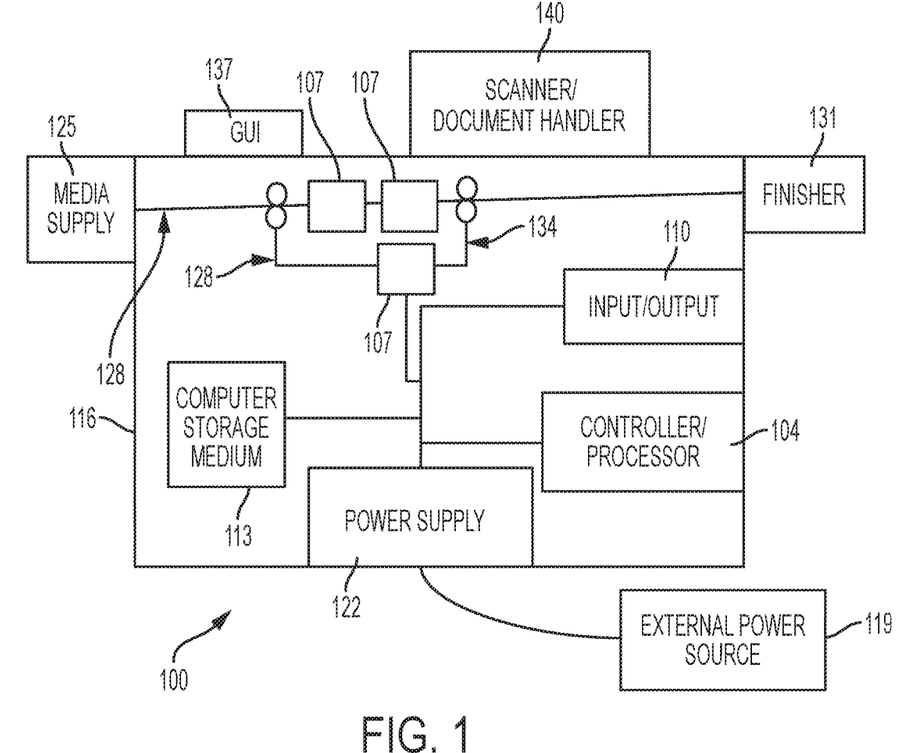
FIG. 1 is a schematic diagram illustrating printing devices herein.

FIG. 1 illustrates many components of an exemplary multi-function device (MFD) 100, which can be used with methods herein. The MFD 100 includes a controller/processor 104 and at least one marking device (print engine(s)) 107 operatively connected to the controller/processor 104. The MFD 100 may also include a communications port (Input/Output device 110) operatively connected to the controller/processor 104 and to a computerized network external to the MFD 100. The Input/Output device 110 may be used for communications to and from the MFD 100.

The controller/processor 104 controls the various actions of the MFD 100, as described below. A non-transitory computer storage medium device 113 (which can be optical, magnetic, capacitor based, etc.) is readable by the controller/processor 104 and stores instructions that the controller/processor 104 executes to allow the MFD 100 to perform its various functions, such as those described herein.

According to systems and methods herein, the controller/processor 104 may comprise a special purpose processor that is specialized for processing image data and includes a dedicated processor that would not operate like a general purpose processor because the dedicated processor has application specific integrated circuits (ASICs) that are specialized for the handling of image processing operations, processing image data, calculating pixel values, etc. In one example, the multi-function device 100 is special purpose machine that includes a specialized image processing card having unique ASICs or processor for providing color image processing, includes specialized boards having unique ASICs for input and output devices to speed network communications processing, a specialized processor that performs the logic of the methods described herein using dedicated unique hardware logic circuits, etc. It is contemplated that the controller/processor 104 may comprise a raster image processor (RIP). A raster image processor uses the original image description to RIP the job. Accordingly, for a print job, the print instruction data is converted to a printer-readable language. The print job description is generally used to generate a ready-to-print file. The ready-to-print file may be a compressed file that can be repeatedly accessed for multiple (and subsequent) passes.

Thus, as shown in FIG. 1, a body housing 116 has one or more functional components that operate on power supplied from an external power source 119, which may comprise an alternating current (AC) power source, through the power supply 122. The power supply 122 can comprise a power storage element (e.g., a battery) and connects to the external power source 119. The power supply 122 converts the power from the external power source 119 into the type of power needed by the various components of the MFD 100.

The multi-function device 100 herein has a media supply 125 supplying media to a media path 128. The media path 128 can comprise any combination of belts, rollers, nips, drive wheels, vacuum devices, air devices, etc. The print engine 107 is positioned along the media path 128. That is, the multi-function device 100 comprises a document-processing device having the print engine(s) 107. The print engine(s) 107 prints marks on the media. After receiving various markings from the print engine(s) 107, the sheets of media can optionally pass to a finisher 131 which can fold, staple, sort, etc., the various printed sheets. As described herein, a return paper path 134 may deliver the printed sheets to the same or different print engine 107 for at least a second layer of toner/ink to be applied. Each return of the media to the print engine 107 is referred to herein as a "pass".

The print engine(s) 107 may include a color toner/ink-applying component (i.e., a source of pigmented toner) that supplies at least pigmented colorant for applying colored toner/ink to the media passing through the print engine 107.

In addition, the multi-function device 100 can include at least one accessory functional component, such as a graphic user interface (GUI) assembly 137 or other accessory functional component (such as a scanner/document handler 140, automatic document feeder (ADF), etc.) that operate on the power supplied from the external power source 119 (through the power supply 122).

As would be understood by those ordinarily skilled in the art, the multi-function device 100 shown in FIG. 1 is only one example and the systems and methods herein are equally applicable to other types of devices that may include fewer components or more components. For example, while a limited number of print engines and media paths are illustrated in FIG. 1, those ordinarily skilled in the art would understand that many more paper paths and additional print engines could be included within any device used with embodiments herein.

Thus, an image input device is any device capable of obtaining pixel values from an image, in particular color pixel values from color images. The set of image input devices is intended to encompass a wide variety of devices such as, for example, digital document devices, computer systems, memory and storage devices, networked platforms such as servers and client devices which can obtain pixel values from a source device. An image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like. To render an image is to reduce the image data (or a signal thereof) to viewable form; store the image data to memory or a storage device for subsequent retrieval; or communicate the image data to another device. Such communication may take the form of transmitting a digital signal of the image data over a network, as described in further detail below.

Systems and methods herein may be used for dynamically calculating the ABS required for a specific paper type and using this selection for scanning that paper type in subsequent jobs. The ABS value may be optionally optimized by the user through a user interface (GUI). The dynamically calculated Automatic Background Suppression (ABS) may be passed as a tag that selects a pre-computed tone reproduction curve (TRC) curve, such that the results are immediately applied and are pertinent to the page that is copied at that exact moment.

Figure 2:
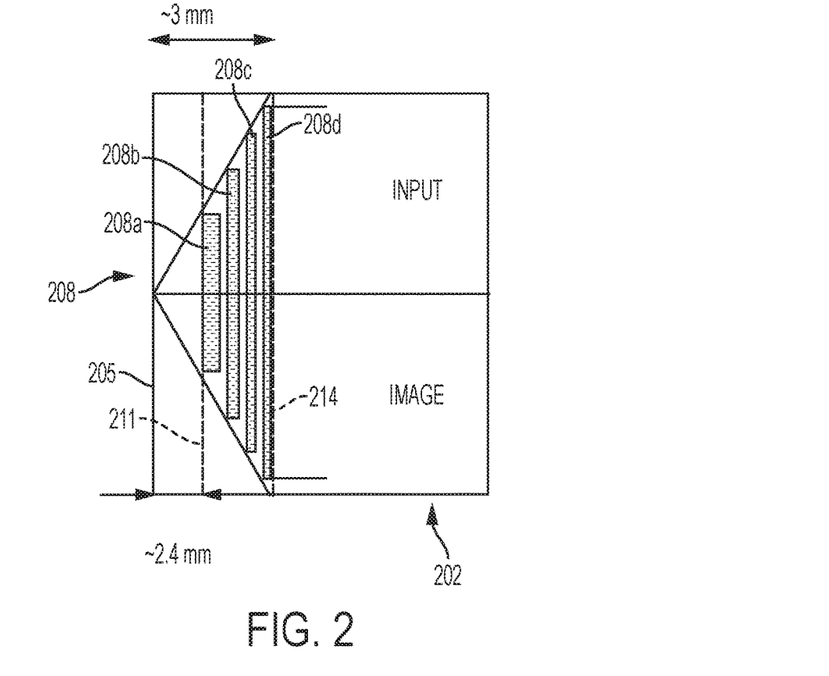
FIG. 2 illustrates a method for calculating Automatic Background Suppression (ABS) according to systems and methods herein.
Figure 3:
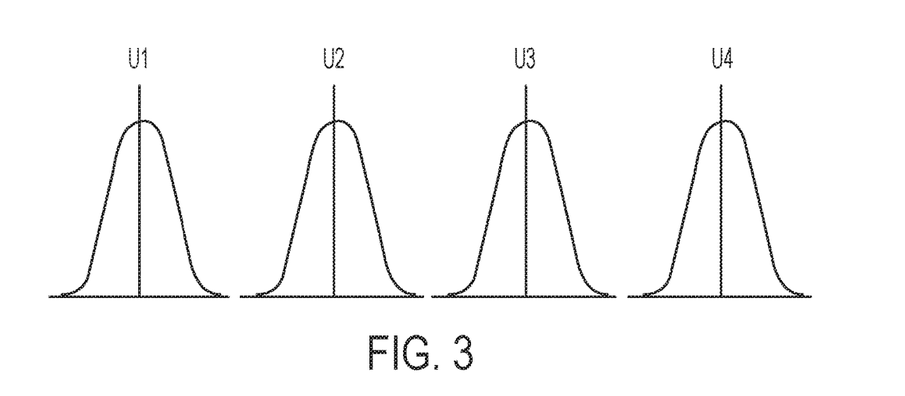
FIG. 3 shows whiteness histograms according to systems and methods herein.

Referring to FIG. 2, one method of determining Automatic Background Suppression (ABS) is to scan an input image 202. The lead edge 205 of the input image 202 is analyzed over a number of windows 208 and histograms (as shown in FIG. 3) of the digital values in the windows 208 are created. A slow scan may be used, which starts at the start line 211 approximately 2.4 mm from the leading edge 205. The slow scan end line 214 is approximately 3 mm from the leading edge 205. The slow scan creates a plurality of the histogram windows 208a-208d. Each histogram window 208a-208d has the same area and there are approximately 5 pixel lines between each window 208. Furthermore, there is a margin of approximately 150 pixels between the edge of the largest window 208*d* and the edge of the input image 202.

Figure 4:
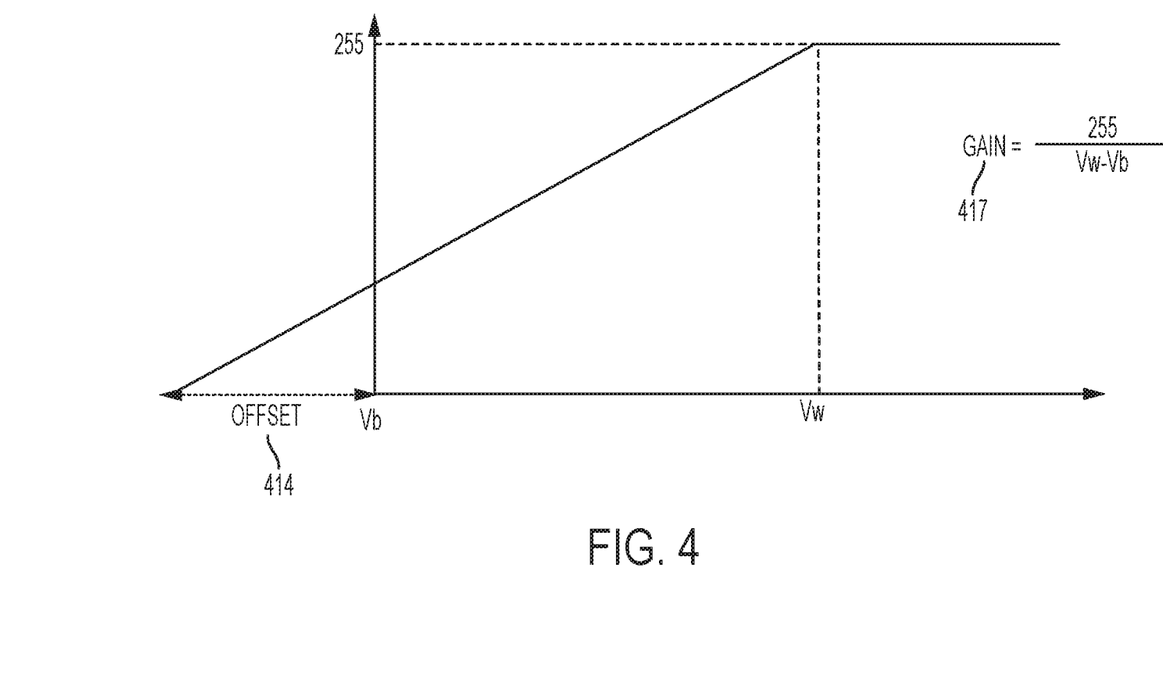
FIG. 4 illustrates a method for calculating ABS offset according to systems and methods herein.
Figure 5:
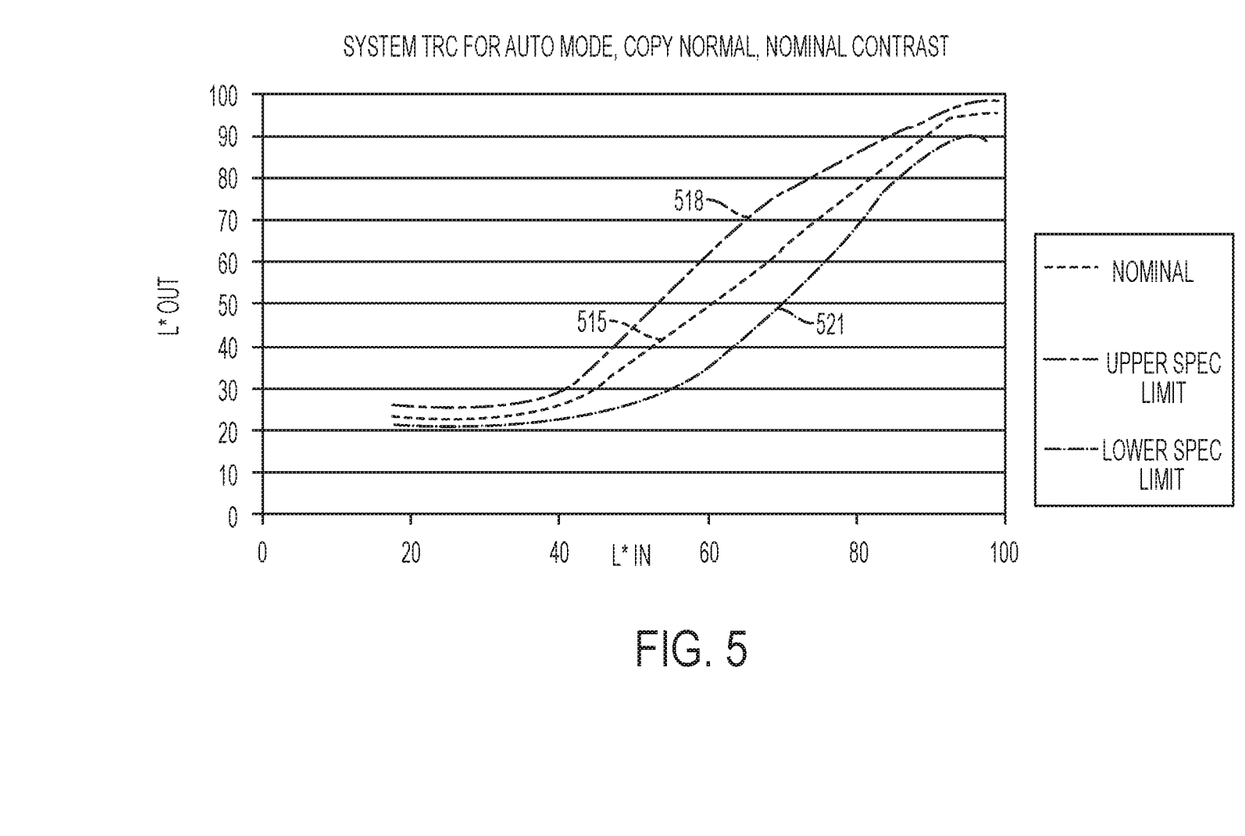
FIG. 5 shows a Tone Reproduction Curve (TRC)

As shown in FIG. 3, the highest U value, which is the whitest, is chosen. (As would be known by one of ordinary skill in the art, on a digital scale, the theoretical value for pure white is 255 and the theoretical value for pure black is 0.) In order to account for paper artifacts, and the like, the U value determined from the histogram analysis is reduced by a predetermined amount to generate a slightly darker value than the whitest point scanned. This value is referred to as Vw. In other words, Vw is the modified lead edge white value obtained from the histogram windows 208*a*-208. Similarly, the darkest value, Vb, is fixed at a predetermined amount above zero. As shown in FIG. 4, the Vw and Vb values may be used to determine an offset 414 and gain 417 that can be used to form the overall TRC. In addition to the Vw and Vb values, a user can select preferred amounts of lightness and contrast, which are then used to generate a tone reproduction curve (TRC). That is, the lightness and contrast are combined with the gain curve, such as shown in FIG. 4, to create the TRC. FIG. 5 shows a typical system TRC 515 for automatic imaging. The TRC 515 shown in FIG. 5 uses nominal contrast. For comparison, FIG. 5 also shows an upper limit curve 518, having maximum contrast and a lower limit curve 521, having minimum contrast.

Currently, a single, fixed background suppression calculation is used for an imaging mode or job. The downside of this is that it does not take account of the actual media being scanned or any variation within a job; hence one might get background or lose highlights in the reproduction.

According to systems and methods, herein, the amount of ABS required can be dynamically calculated. The ABS value can then be passed as a selection tag in order to select a pre-computed TRC, such that no re-build of the image path is required and the result can immediately be applied to the page processed in that moment. In other words, the TRC 515 can be different for each input image 202 and may be dynamically changed as the image is fed through the TRC 515.

Figure 6:
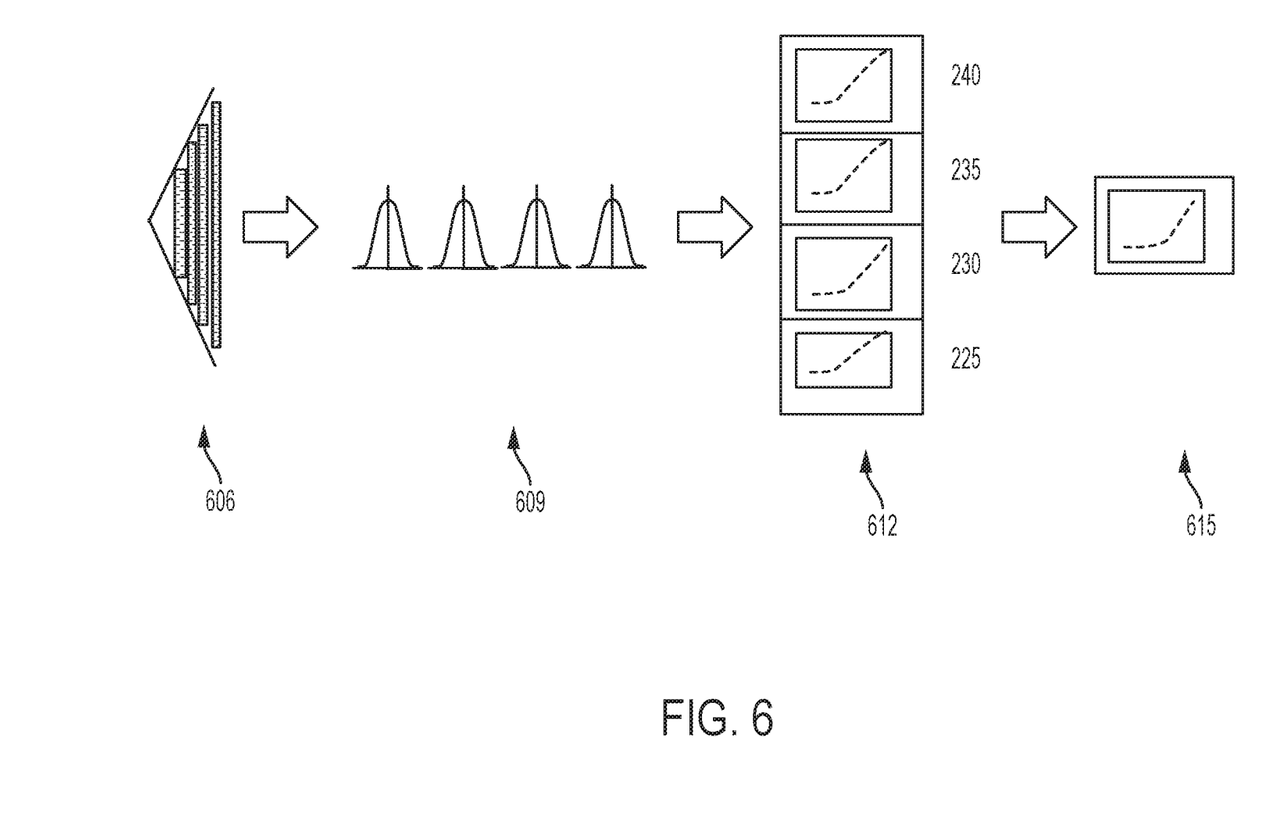
FIG. 6 illustrates a method for selecting a TRC according to systems and methods herein.

Referring now to FIG. 6, according to systems and methods herein, the scanner looks at the leading edge of the input image, as shown at 606. As described above, histograms can be created and the Vw value required can be determined, as shown at 609. A pre-computed TRC can simply be selected based on the Vw required, such as shown at 612. The selected TRC can be used within the already built image processing path, as shown at 615. In addition, instead of calculating a curve for every Vw level, a binning system can be used so that a smaller number of pre-computed curves is required and a curve is chosen dependent on which range the Vw level is in.

As mentioned above, in the case of the Software Image Path (SWIP), the image path is already built and processing parameters are already set at the beginning of processing a page. According to systems and methods herein, the ABS required can be dynamically calculated and the result can be passed as a tag (such as the associated Vw value) that is used to select a pre-computed TRC curve. In other words, each page of a job can be scanned, in turn, and the image data obtained by scanning each page can be analyzed. The background luminance for each page can be determined based on the analysis of the image data. A background suppression value can be calculated for each page based on the background luminance. Then, one of a pre-built tone reproduction curve (TRC) can be selected to be applied to the job, based on the background suppression value. Note; since the suppression is calculated on pages of a scanned original, the job may comprise a print job, a scan job, a copy job, etc.

Alternatively or in addition, according to systems and methods herein, the pre-computed TRC can also be selected for automatic background suppression based on the type of paper used. That is, the ABS required for a specific paper type can be dynamically calculated. That ABS value can then be used for scanning that paper type in subsequent jobs. It is also contemplated that this ABS value may be optionally 'optimized' by the user.

The user selects the paper type from a predefined list stored in a memory, such as the computer storage medium 113 of the multi-function device 100. Alternatively, the user enters the scanned paper type. This allows the user to either use a pre-set ABS value or, if the paper is not in the database, a new ABS value can be calculated and stored. Furthermore, the user has the option to tweak the ABS setting, as desired. Variations of the logic in the flowchart below are also possible (such as prompting for printing samples even in the case when the user has selected a pre-existent paper).

Figure 7:
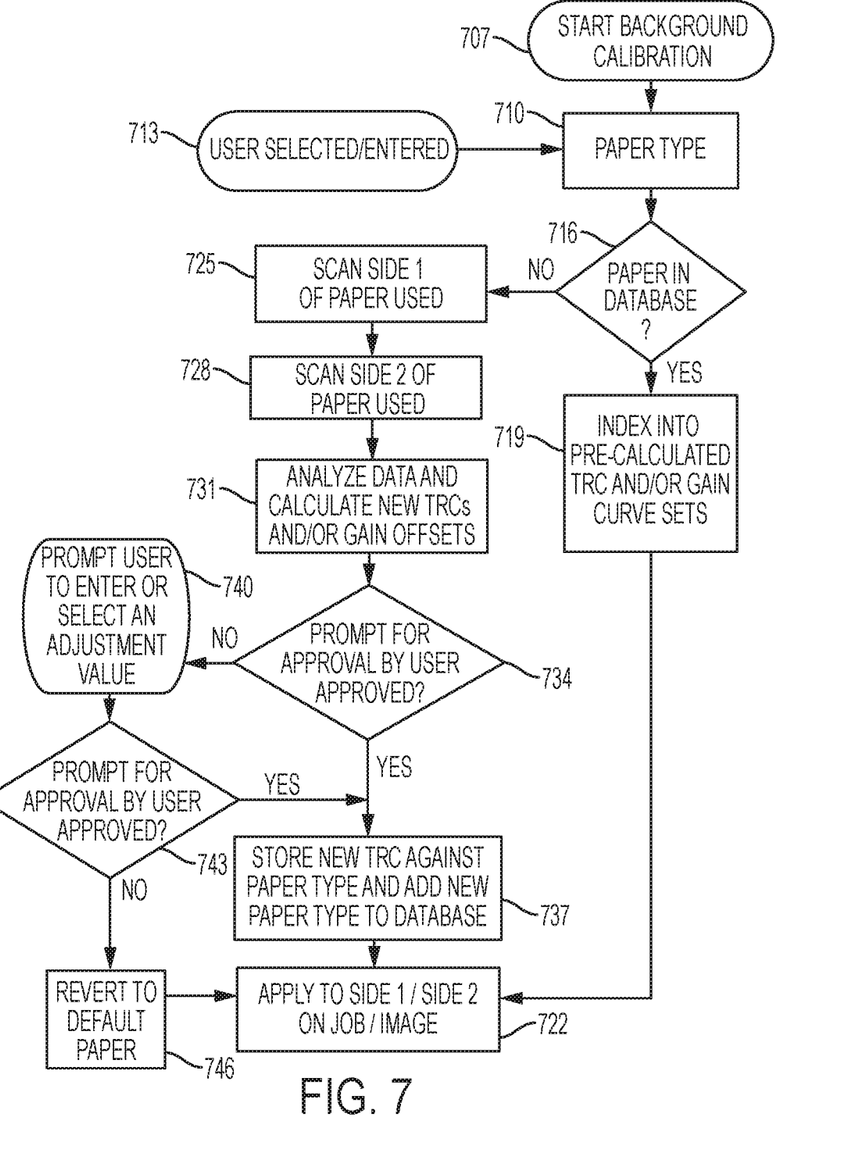
FIG. 7 is a flow chart according to systems and methods herein.

Referring to FIG. 7, the process may start with background calibration, at 707. A paper type 710 can be selected or entered by a user, at 713. All the user operations described below can be performed using the GUI assembly 137 of the MFD 100. At 716, the controller/processor 104 determines if the paper type 710 is in the database. If so, at 719, a pre-computed TRC is automatically selected for ABS based on the paper type 710, which is applied to side 1 and side 2 for the current job, at 722. If, at 716, the controller/processor 104 determines that the paper type 710 is not in the database, the user is prompted to scan side 1 of the paper being used, at 725. Then, at 728, the user is prompted to scan side 2 of the paper being used. At 731, the image data obtained by scanning each side of the paper being used is analyzed and a new tone reproduction curve (TRC) is computed for the paper. At 734, the user may be prompted to approve the new TRC. At this stage, the user may optionally have samples printed using the new TRC. If the user approves the new TRC, at 737, the paper type 710 may be added to the database and the new TRC may be labeled and stored associated with the paper type 710. The new TRC is applied to side 1 and side 2 of the paper for the current job, at 722. If, at 734, the user does not approve the new TRC, at 740, the user may be prompted to enter or select an adjustment value for the new TRC. The adjustment value may be linked to a set of curves derived from the recently computed TRCs and/or gains and offsets. Again, at 743, the user may be prompted to approve the adjusted TRC. The user may optionally have samples printed using the adjusted TRC. If the user approves the adjusted TRC, the paper type 710 may be added to the database and the new TRC may be labeled and stored associated with the paper type 710, as described above. If, after adjustment, the user does not approve the adjusted TRC, the MFD 100 reverts to the default paper ABS, at 746. The default paper ABS is applied to side 1 and side 2 of the paper for the current job, at 722.

Figure 8:
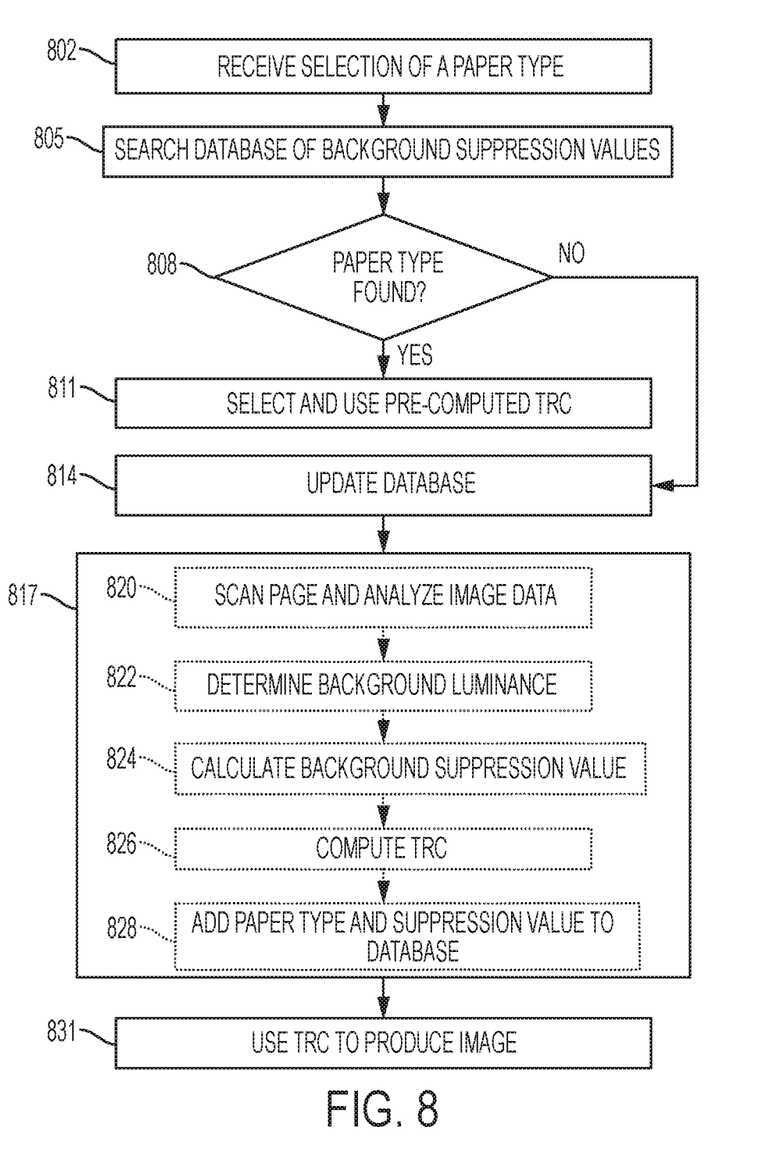
FIG. 8 is a flow chart illustrating methods herein.

FIG. 8 is a flow diagram illustrating the processing flow of an exemplary method according to the present disclosure. At 802, a selection of a paper type for producing an image is received. At 805, a database of background suppression values associated with paper types is searched. At 808, if the paper type is found, a pre-computed Tone Reproduction Curve (TRC) is selected, at 811, based on the background suppression for the paper type. Responsive to not finding a background suppression value associated with the paper type, the database is updated for the paper type, at 814. The updating process is illustrated at 817. According to the method of updating, at 820, a page of the paper type is scanned and image data obtained by scanning the page is analyzed. At 822, background luminance for the page is determined based on analyzing the image data. At 824, a background suppression value is calculated for the page based on the background luminance. At 826, a Tone Reproduction Curve (TRC) associated with the background suppression value is computed. At 828, the paper type and the background suppression value for the page are added to the database. The background suppression value is associated with the paper in the database. At 831, the image is produced on the paper type using the TRC.

Figure 9:
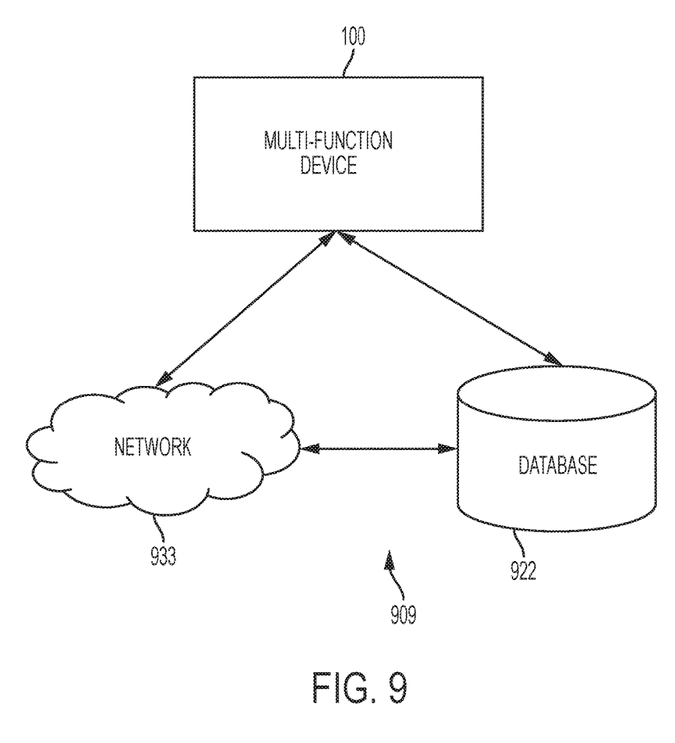
FIG. 9 is a block diagram of a network according to systems and methods herein.

FIG. 9 is a general overview block diagram of a network, indicated generally as 909, for communication between the multi-function device 100 and a database 922. The multi-function device 100 may comprise any form of processor as described in detail above. The multi-function device 100 can be programmed with appropriate application software to implement the methods described herein. Alternatively, the multi-function device 100 is a special purpose machine that is specialized for processing image data and includes a dedicated processor that would not operate like a general purpose processor because the dedicated processor has application specific integrated circuits (ASICs) that are specialized for the handling of image processing operations, processing pixel data, etc. In one example, the multi-function device 100 is special purpose machine that includes a specialized card having unique ASICs for providing image processing instructions, includes specialized boards having unique ASICs for input and output devices to speed network communications processing, a specialized ASIC processor that performs the logic of the methods described herein (such as the processing shown in FIGS. 7 and 8) using dedicated unique hardware logic circuits, etc.

Database 922 includes any database or any set of records or data that the multi-function device 100 desires to retrieve. Database 922 may be any organized collection of data operating with any type of database management system. The database 922 may contain matrices of datasets comprising multi-relational data elements.

The database 922 may communicate with the multi-function device 100 directly. Alternatively, the database 922 may communicate with the multi-function device 100 over network 933. The network 933 comprises a communication network either internal or external, for affecting communication between the multi-function device 100 and the database 922.

Figure 10:
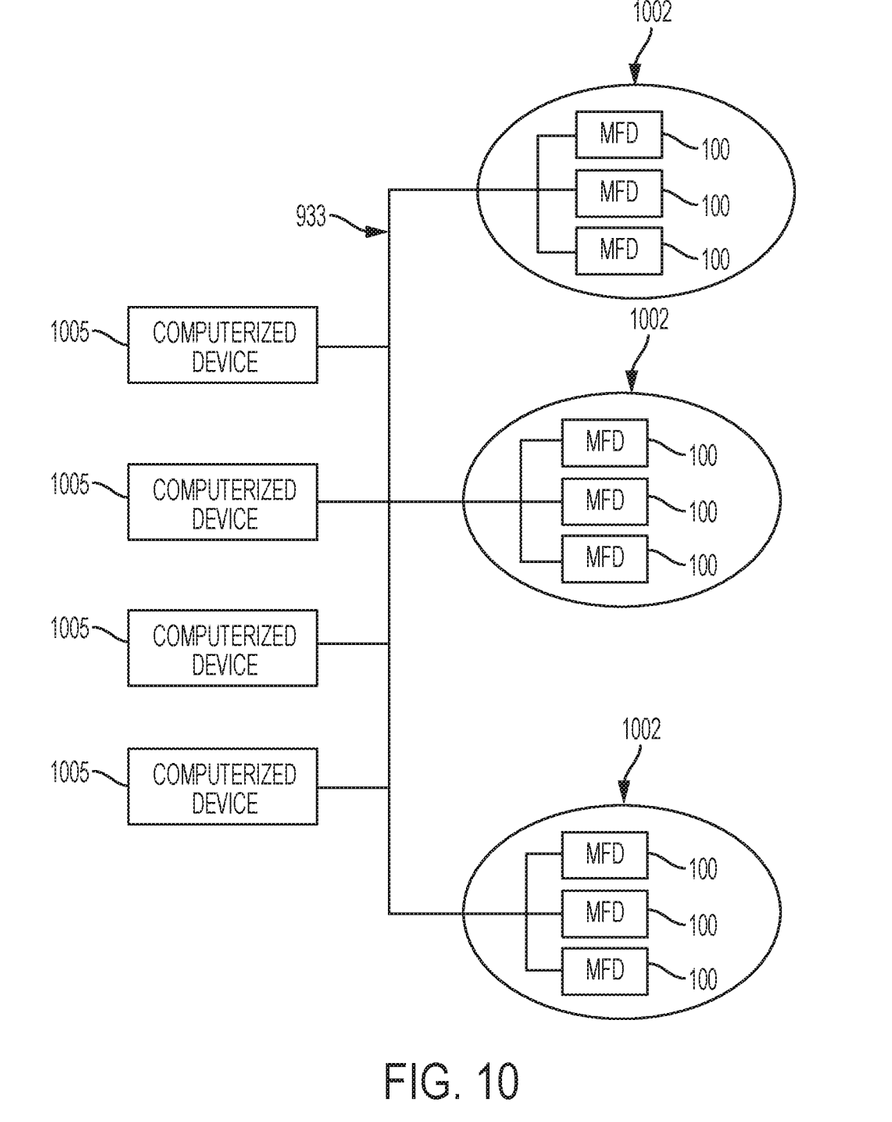
FIG. 10 is a schematic diagram illustrating systems and methods herein.

As shown in FIG. 10, exemplary printers, copiers, multi-function machines, and multi-function devices (MFD) 100 may be located at various different physical locations 1002. Other devices according to systems and methods herein may include various computerized devices 1005. The computerized devices 1005 can include print servers, printing devices, personal computers, etc., and are in communication (operatively connected to one another) by way of the network 933. The network 933 may be any type of network, including a local area network (LAN), a wide area network (WAN), or a global computer network, such as the Internet.

To render an image is to reduce the image data (or a signal thereof) to viewable form; store the image data to memory or a storage device for subsequent retrieval; or communicate the image data to another device. Such communication may take the form of transmitting a digital signal of the image data over a network.

Some of the benefits described herein include a system/user interface (UI) in the scan path that allows a user to specify and pre-store optimal ABS TRCs for custom paper types and/or paper type selections. Additional benefits include a new system in the scan path that derives and passes parameters (in the form of tags) to select among pre-stored TRCs. The pre-stored TRC can be applied in the image path for the purpose of ABS. Further, systems and methods herein allow a version of ABS to run where otherwise this would not be possible for improved image quality.

According to a further systems and methods herein, an article of manufacture is provided that includes a tangible computer readable medium having computer readable instructions embodied therein for performing the steps of the computer implemented methods, including, but not limited to, the method illustrated in FIGS. 7 and 8. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIGS. 7 and 8.

The computer program instructions may be stored in a computer readable medium that can direct a computer, other programmable data processing apparatus, or other devices to process in a particular manner, such that the instructions stored in the computer readable medium produce an article of manufacture including instructions which implement the process/act specified in the flowchart and/or block diagram block or blocks.

The hardware described herein plays a significant part in permitting the foregoing method to be performed, rather than function solely as a mechanism for permitting a solution to be achieved more quickly, (i.e., through the utilization of a computer for performing calculations). Specifically, printers, scanners, and image processors that alter electronic documents each play a significant part in the methods (and the methods cannot be performed without these hardware elements). Therefore, these hardware components are fundamental to the methods being performed and are not merely for the purpose of allowing the same result to be achieved more quickly.

As would be understood by one ordinarily skilled in the art, the processes described herein cannot be performed by human alone (or one operating with a pen and a pad of paper) and instead such processes can only be performed by a machine. Specifically, processes such as printing, scanning, electronically altering color schemes using an image processor, etc., require the utilization of different specialized machines. Therefore, for example, the printing/scanning performed by the user device cannot be performed manually (because it can only be done by printing and scanning machines) and is integral with the processes performed by methods herein. In other words, these various machines are integral with the methods herein because the methods cannot be performed without the machines (and cannot be performed by humans alone).

As will be appreciated by one skilled in the art, aspects of the systems and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a 'circuit', 'module,' or 'system.' Furthermore, aspects of the present disclosure may take the form of a computer program product embodied in one or more computer readable medium(s) having computer readable program code embodied thereon.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, the claims presented below are not intended to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, processors, etc., are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, print engines, etc., are well known, and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The terminology used herein is for the purpose of describing particular examples of the disclosed structures and methods and is not intended to be limiting of this disclosure. For example, as used herein, the singular forms 'a', 'an', and 'the' are intended to include the plural forms as well, unless the context clearly indicates otherwise. Additionally, as used herein, the terms 'comprises', 'comprising', 'includes', and/or 'including', when used in this specification, specify the presence of stated features, integers, steps, operations, elements, and/or components, but do not preclude the presence or addition of one or more other features, integers, steps, operations, elements, components, and/or groups thereof. Further, the terms 'automated' or 'automatically' mean that once a process is started (by a machine or a user), one or more machines perform the process without further input from any user.

The corresponding structures, materials, acts, and equivalents of all means or step plus process elements in the claims below are intended to include any structure, material, or act for performing the process in combination with other claimed elements as specifically claimed. The descriptions of the various systems and methods of the present disclosure have been presented for purposes of illustration, but are not intended to be exhaustive or limited to the systems and methods disclosed. Many modifications and variations will be apparent to those of ordinary skill in the art without departing from the scope and spirit of the described systems and methods. The terminology used herein was chosen to best explain the principles of the systems and methods, the practical application or technical improvement over technologies found in the marketplace, or to enable others of ordinary skill in the art to understand the systems and methods disclosed herein.

It will be appreciated that the above-disclosed and other features and processes, or alternatives thereof, may be desirably combined into many other different systems or applications. Those skilled in the art may subsequently make various presently unforeseen or unanticipated alternatives, modifications, variations, or improvements therein, which are also intended to be encompassed by the following claims. Unless specifically defined in a specific claim itself, steps or components of the systems and methods herein should not be implied or imported from any above example as limitations to any particular order, number, position, size, shape, angle, color, temperature, or material.

What is claimed is:

1. A method comprising:
   scanning each page of a job in turn using an image input device to create digital image data of each said page and analyzing said digital image data obtained by scanning each said page, said analyzing said digital image data obtained by scanning each said page comprising using an image processor;
   determining background luminance for each said page based on said analyzing said digital image data using said image processor;
   calculating a background suppression value for each said page based on said background luminance using said image processor;
   selecting one of a pre-built tone reproduction curve (TRC) from a database comprising a plurality of pre-built tone reproduction curves to be applied to said job based on said background suppression value, each of said pre-built tone reproduction curves being based on a background suppression value;
   adjusting color values for pixels in input digital image data according to the selected pre-built TRC, using said image processor; and
   outputting said digital image data having adjusted color values for said pixels, using an image output device.

2. The method according to claim 1, said analyzing said digital image data obtained by scanning each said page further comprising:
   analyzing a leading edge of an input image to create a plurality of histogram windows on the leading edge of said page, wherein each histogram window of said plurality of histogram windows has the same area and the same space between each histogram window of said plurality of histogram windows; and
   producing a luminance histogram array of said input image from said plurality of histogram windows.

3. The method according to claim 2, further comprising:
   processing said luminance histogram array of said input image to determine said background luminance for said page.

4. The method according to claim 1, further comprising:
   receiving a selection of a paper type for producing said job;

searching said database for a background suppression value associated with said paper type; and selecting one of said pre-built tone reproduction curves based on said background suppression value associated with said paper type.

5. The method according to claim 4, further comprising:
responsive to not finding a background suppression value associated with said paper type, updating said database for said paper type, said updating comprising:
scanning a page of said paper type using the image input device to create digital image data of each said page and analyzing said digital image data obtained by scanning said page,
determining background luminance for each said page based on said analyzing said digital image data using the image processor,
calculating a background suppression value for said page based on said background luminance using said image processor, and
adding said paper type and said background suppression value for said page to said database, said background suppression value being associated with said paper type.

6. The method according to claim 1, further comprising:
identifying a paper type for said page of said job;
associating the selected one of said paper type and background suppression value with said pre-built tone reproduction curves to be applied to said job; and
adding said paper type and associated tone reproduction curve to said database.

7. A method comprising:
receiving a selection of a paper type for producing an output image;
searching a database of background suppression values associated with paper types and selecting a pre-computed Tone Reproduction Curve (TRC) based on background suppression for said paper type;
adjusting color values for pixels in input image data according to said selected pre-computed TRC, using an image processor; and
outputting image data using adjusted color values for said pixels in said input image, using an image output device,
responsive to not finding a background suppression value associated with said paper type, updating said database for said paper type, said updating comprising:
scanning a page of said paper type using an image input device to create digital image data of said page and analyzing said digital image data obtained by scanning said page,
determining background luminance for said page based on said analyzing said digital image data using said image processor,
calculating a background suppression value for said page based on said background luminance using said image processor,
computing a new Tone Reproduction Curve (TRC) associated with said background suppression value,
adding said paper type and said background suppression value for said page to said database, said background suppression value being associated with said paper type, and
producing an output image on said paper type using said new TRC.

8. The method according to claim 7, further comprising:
scanning the page of said paper type and analyzing the leading edge of an input image over a number of windows; and
producing a luminance histogram array of said input image.

9. The method according to claim 8 said scanning said page of said paper type further comprising:
scanning a first side of said page; and
scanning a second side of said page.

10. The method according to claim 8, further comprising:
processing said luminance histogram array of said input image to determine said background luminance for said page.

11. The method according to claim 7, further comprising:
automatically selecting a Tone Reproduction Curve (TRC) associated with said background suppression value.

12. The method according to claim 11, further comprising:
adjusting color values for pixels in said image data according to said selected TRC; and
outputting image data using adjusted color values for said pixels in said input image, according to said selected TRC.

13. The method according to claim 7, said database comprising background suppression values associated with said paper types and at least one pre-computed TRC based on said background suppression values.

14. The method according to claim 7, further comprising:
manually adjusting the new TRC.

15. The method according to claim 7, further comprising:
adding said new TRC to said database associated with said paper type and said background suppression value.

16. A system, comprising:
an image input device receiving an image;
a processor operatively connected to said image input device, said processor further comprising an image processor;
a user interface operatively connected to said processor;
a database comprising a plurality of pre-computed tone reproduction curves (TRCs), each of said pre-computed TRCs being based on a background suppression value; and
an output device operatively connected to said image processor,
said image input device scanning a page having said image and analyzing image data obtained by scanning said page,
said image processor determining background luminance for said page based on said analyzing said image data,
said image processor computing a calculated background suppression value for said page based on said background luminance,
said image processor selecting one of said pre-computed TRCs from said database based on said calculated background suppression value, said image processor adjusting color values of said image according to said selected pre-computed TRC, and said image processor outputting said image using adjusted color values,
said output device producing said image having said adjusted color values,
responsive to said user interface receiving a selection of a paper type for producing said image, said processor searching said database for a background suppression value associated with said paper type, responsive to finding a background suppression value associated with said paper type, said processor selecting a pre-computed TRC for producing said image, said image processor adjusting color values of said image according to said selected pre-computed TRC, and said image processor outputting said image using adjusted color values, and responsive to not finding a background suppression value associated with said paper type, said processor updating said database for said paper type, said updating comprising:
said image input device scanning a first side of a page of said paper type,
said image input device scanning a second side of said page of said paper type,
said image processor analyzing image data obtained by scanning said first side and said second side of said page of said paper type and calculating a background suppression value for said page of said paper type,
said image processor computing a new Tone Reproduction Curve (TRC) associated with said background suppression value for said page of said paper type,
said processor adding said paper type and said background suppression value for said page to said database, said background suppression value being associated with said paper type,
said image processor adjusting color values for said input image according to said new TRC,
said image processor outputting said input image using adjusted color values and
said output device producing said image having said adjusted color value.

17. The system according to claim 16, further comprising:
said image input device scanning the page of said paper type and said image processor analyzing the leading edge of an input image over a number of windows; and
said image processor producing a luminance histogram array of said input image.

18. The system according to claim 17, further comprising:
said image processor processing said luminance histogram array of said input image to determine said background luminance for said page.

19. The system according to claim 16, further comprising:
said image processor adjusting the new TRC based on input entered into said user interface.

20. The system according to claim 16, said output device comprising a marking engine operatively connected to said image processor.

* * * * *